(12) United States Patent
Buchholz et al.

(10) Patent No.: US 6,706,854 B2
(45) Date of Patent: Mar. 16, 2004

(54) PROCESS FOR PREPARING REABSORBABLE POLYESTERS BY MASS POLYMERIZATION

(75) Inventors: Berthold Buchholz, Ockenheim (DE); Matthias Schellhorn, Horrweiler (DE); Andreas Weber, Kleinich (DE)

(73) Assignee: Boehringer Ingelheim Pharma GmbH & Co. KG, Ingelheim (DE)

( * ) Notice: Subject to any disclaimer, the term of this patent is extended or adjusted under 35 U.S.C. 154(b) by 13 days.

(21) Appl. No.: 10/339,441

(22) Filed: Jan. 9, 2003

(65) Prior Publication Data

US 2003/0162894 A1 Aug. 28, 2003

Related U.S. Application Data

(60) Provisional application No. 60/352,042, filed on Jan. 25, 2002.

(30) Foreign Application Priority Data

Jan. 11, 2002 (DE) .......................... 102 00 738

(51) Int. Cl.$^7$ .......................... C08G 63/08; C08F 2/02; C08F 20/00
(52) U.S. Cl. .......................... 528/354; 526/62; 526/64; 526/65; 528/361; 528/365; 525/437; 525/444
(58) Field of Search .............................. 526/62, 64, 65; 528/354, 361, 365; 525/437, 444

(56) References Cited

U.S. PATENT DOCUMENTS

| 4,379,138 A | 4/1983 | Pitt et al. |
|---|---|---|
| 4,539,981 A | 9/1985 | Tunc |
| 4,550,449 A | 11/1985 | Tunc |

FOREIGN PATENT DOCUMENTS

| EP | 0 661 325 | 7/1995 |
|---|---|---|
| WO | WO 84/04311 | 11/1984 |

OTHER PUBLICATIONS

Nieuwenhuis, J.; "Synthesis of Polytactides, Polyglycolides and Their Copolymers"; Clinical Materials, 1992; vol. 10, pp. 59–67.

Leensiag, J. et al.; "Synthesis of high–molecular–weight poly(L–lactide) initiated with tin 2–ethyhexanoatea)"; Makromol. Chem., 1987, vol. 188, pp. 1809–1814.

*Primary Examiner*—Samuel A. Acquah
(74) *Attorney, Agent, or Firm*—Robert P. Raymond; Alan R. Stempel; Mary-Ellen M. Devlin

(57) ABSTRACT

The invention relates to a process for preparing reabsorbable polyesters by bulk polymerisation, wherein the reaction components are melted and homogenised in a stirred reactor, the reaction mixture is then transferred into a number of smaller-volume containers, the reaction mixture is polymerised in these containers and the polyester obtained is isolated by removing it from the containers, and the use of the reabsorbable polyesters thus produced for preparing reabsorbable implants.

21 Claims, No Drawings

PROCESS FOR PREPARING REABSORBABLE POLYESTERS BY MASS POLYMERIZATION

RELATED APPLICATIONS

Benefit of U.S. Provisional Application Serial No. 60/352,042, filed on Jan. 25, 2002 is hereby claimed.

FIELD OF THE INVENTION

The invention relates to a process for preparing reabsorbable polyesters by bulk polymerisation, wherein the reaction components are melted and homogenised in a stirred reactor, the reaction mixture is then transferred into a number of smaller-volume containers, the reaction mixture is polymerised in these containers and the polyester obtained is isolated by removing it from the containers.

BACKGROUND TO THE INVENTION

Reabsorbable polyesters for the purposes of the present process are aliphatic polyesters based on lactide (L-lactide, D-lactide, DL-lactide, meso-lactide) or glycolide as well as copolymers with two or more different comonomer units of the abovementioned monomers with one another and copolymers of the monomers with trimethylene carbonate (TMC) and/or $\epsilon$-caprolactone. This group of polyesters is preferably used to prepare reabsorbable implants for use in human or animal bodies, such as for example for fixation elements, films, membranes, suture thread or also for pharmaceutical release systems.

Polymerisation processes for preparing reabsorbable polyesters are known from the prior art. In addition to polycondensation processes which can only be used to produce relatively low-molecular polyesters, they are preferably prepared by ring-opening polymerisation of the corresponding cyclic monomers, namely L-lactide, D-lactide, DL-lactide, meso-lactide, glycolide, trimethylene carbonate, $\epsilon$-caprolactone with the addition of metal catalysts. A plurality of catalysts are known from the prior art. Preferably, tin or zinc compounds are used. According to the prior art additives which make it possible to control the molecular weight in the polymer (chain length moderators) may be added to the reaction mixture. Aliphatic alcohols such as ethanol, dodecanol, hydroxycarboxylic acids, such as glycol or lactic acid or also oligomeric lactic acids or water have proved suitable, inter alia.

A number of techniques for the ring-opening polymerisation of lactides and related lactones are also known from the prior art. Fusion polymerisation, bulk polymerisation, solution polymerisation and suspension polymerisation are described, for example (e.g. J. Nieuwenhuis, Clinical Materials, 10, 59–67, 1992). Of these, fusion and bulk polymerisation are of the greatest technical importance. The difference between the two techniques is the reaction temperature. Whereas all the reaction components are in a molten state in fusion polymerisation, the bulk polymerisation is carried out at a temperature situated between the melting points of the particular monomer and polymer. Depending on the type of monomer/polymer the temperature during bulk polymerisation may be between about 50° C. and 180° C., whereas for fusion polymerisation temperatures in the range from about 190 to 230° C. generally have to be selected.

The advantage of bulk polymerisation over fusion polymerisation is the lower reaction temperature: because of the more moderate temperature side reactions occur to a considerably lesser extent. Side reactions during polymerisation are detrimental on the one hand as they cause chain termination in the growth reaction and thereby reduce the molecular weight in the polymer. Reabsorbable polyesters with a very high molecular weight can therefore only be produced by bulk polymerisation and not in a melt. The high reaction temperatures of the fusion polymerisation also have the drawback that the resulting polymers may have some discoloration. These impurities produced at high temperatures are generally polymer-bound and cannot therefore be removed from the product in a subsequent purification step. With respect to the preferred use of the polyesters in the human body it is advantageous to avoid contamination of every kind.

Another advantage of a low reaction temperature may be the suppression of transesterifications during the polymerisation. In this way it is possible to prevent strong randomisation of the monomer sequences during copolymerisation. Because of the different reactivities of the individual monomers copolymers with a block-like sequence can be produced at low temperature.

It is known, particularly with regard to poly(L-lactide), e.g. from U.S. Pat. Nos. 4,539,981 and 4,550,449 as well as from J. Leenslag, A. Pennings, Makromol. Chem. 188, 1809–1814, 1987, that by a suitable choice of the reaction conditions such as the reaction time and temperature as well as the concentration of the catalyst and the chain length moderator, the bulk polymerisation can be controlled accordingly in terms of the molecular weight of the reaction product and the speed of the reaction.

Whereas fusion polymerisation can readily be carried out either continuously or discontinuously on a large scale in suitable polymerisation apparatus, bulk polymerisation presents major problems when performed on a large scale. As the reaction mass solidifies during the polymerisation, it is not possible to carry out the reaction in stirred reactors. The reaction product takes on the shape of the inner wall of the reactor and has to be removed from the reactor as a compact block. Thus, as the reaction mixtures are scaled up, ever larger blocks of material are produced. The handling and also subsequent grinding up into workable granules therefore becomes impossible upwards of a certain order of magnitude. A further difficulty is the removal of the heat of the reaction. As these polymerisation reactions are strongly exothermic, and moreover the polymer mass formed has very poor conductivity, in larger reactors temperature gradients may be formed which give rise to serious and unacceptable inhomogeneities in the product. These inhomogeneities may take the form of different molecular weights and, in the case of copolymers, in different molar compositions as well. According to reference (1) the temperature increase on the inside may be up to 80° C.

Whereas the literature contains sufficient information on the choice of suitable reaction parameters for bulk polymerisation in a small-scale reaction, particularly for poly(L-lactides), the prior art contains no teaching as to how the reaction can be carried out on an industrial scale. The Examples in the literature are carried out on a small scale up to a maximum of a few hundred grams and are, moreover, carried out in test tubes in a laboratory.

The problem is therefore to provide a process which can be used on an industrial scale for preparing reabsorbable polyesters by bulk polymerisation at moderate temperatures by which high quality reabsorbable polyesters can be produced on a large scale.

DETAILED DESCRIPTION OF THE INVENTION

When developing the process it was found, surprisingly, that the problems described above can be overcome by spatially and physically separating the polymerisation reaction into a larger reactor for melting and homogenising the reaction components and into a number of smaller subreactors, preferably made of plastics, for the actual reaction of polymerisation.

In this process the cyclic monomers are reacted, in a manner known per se, with the addition of metal catalysts and optionally chain length moderators to form the respective polymers at temperatures at which the monomer is present in molten form but the reaction product is solid or virtually solid.

The present invention thus relates to a process for preparing reabsorbable polyesters by bulk polymerisation, while the reaction components are melted and homogenised in a stirred reactor, then the reaction mixture is converted into a plurality of smaller-capacity containers, preferably plastic bottles, the reaction mixture is polymerised in these containers and the polyester obtained is isolated by removing it from the containers.

The invention also relates to the use of a reabsorbable polyester for preparing reabsorbable implants by the process according to the invention.

A preferred process comprises the following steps:
(a) melting the monomer(s) in a stirred reactor;
  (a1) adding the catalyst;
  (a2) optionally adding a chain length moderator;
  (a3) homogenising the reaction mixture using a stirrer;
(b) transferring the reaction mixture into smaller plastic containers through a system of tubes;
(c) carrying out the polymerisation reaction in the plastic containers until the desired degree of reaction of the polymerisation is achieved;
(d) removing the polymer block formed from the plastic container.

Further processing can be carried out using methods known per se, such as e.g. grinding into granules and subsequently extracting to eliminate any unreacted monomers or by precipitation methods.

Preferred monomers are those which can be polymerised by ring-opening polymerisation of the corresponding cyclic monomers, for example L-lactide, D-lactide, DL-lactide, meso-lactide, glycolide, trimethylene carbonate and ε-caprolactone.

Homopolyesters selected from among the polyglycolides, particularly poly(L-lactide) or poly(DL-lactide), are preferred.

Also preferred are copolyesters selected from the following groups:
  polylactides which may be obtained from various stereoisomeric lactides, particularly copolyesters of L-lactide and DL-lactide,
  copolyesters of glycolide or lactide and trimethylene carbonate,
  copolyesters of lactide, particularly DL-lactide or L-lactide and glycolide,
  copolyesters of lactide and ε-caprolactone.

Also preferred are terpolymers which are obtained from three different cyclic monomers.

The catalyst may be added as it is or preferably as a solution in an inert and physiologically acceptable diluent. Aliphatic or aromatic hydrocarbons are preferred, particularly toluene or xylene.

The order of steps (a1) and (a2) may be reversed. Depending on the nature of the catalyst and chain length moderator the catalyst may also be dissolved in the chain length moderator.

Throughout the reaction the air space above the reaction mass is made inert by means of an inert anhydrous gas. Argon, helium and nitrogen are preferred, of which nitrogen is particularly preferred.

The reaction mass may be transferred from the melt container into the plastic containers using conventional pumps, by gravity or by applying pressure to the melt reactor using an inert gas, particularly nitrogen. To eliminate any particulate contaminants from the melt a melt filter made of plastics or stainless steel may be interposed.

The capacity of the plastic container may be in the range between 5 ml and 10 liters, preferably in the range between 100 ml and 5 liters, most preferably in the range between 0.5 and 5 liters, particularly about 1 liter.

The stirring reactor for melting and homogenising the reaction mixture may be a conventional reactor the inner wall of which consists of a material which is chemically inert to the reaction mixture, e.g. stainless steel, glass, enamel or Hastelloy. The preferred size of the reactor depends on the desired batch size and may be within the range between 5 and 10,000 liters.

As a rule the ratio of the internal volume of the stirring reactor to that of the internal volume of one of the smaller containers is between 1000:1 and 2:1, preferably 100:1 and 2,5:1, particularly between 75:1 and 3:1.

Containers made of plastics which are chemically and thermally stable at the reaction temperatures chosen may be used for the process. Containers made from plastics selected from among the polyolefins, polycarbonates or fluorinated and partly fluorinated plastics are preferred. Polypropylene and polytetrafluoroethane (Teflon®) are preferred.

The reactions are generally carried out at a temperature between 50° C. and 170° C., preferably between 60° C. and 160° C., particularly between 100° C. and 150° C. The preferred (and particularly preferred) reaction temperatures depend on the particular monomer or monomer mixture and are, for example, for:

| | |
|---|---|
| L-lactide: | 105 to 150° C. (105 to 120° C.) |
| D-lactide: | 105 to 150° C. (105 to 120° C.) |
| DL-lactide: | 125 to 150° C. (125 to 140° C.) |
| meso-lactide: | 60 to 150° C. (90 to 140° C.) |
| L/DL-lactide: | 110 to 150° C. (110 to 120° C.) |
| L-lactide/TMC: | 105 to 150° C. (105 to 120° C.) |
| L-lactide/ε-caprolactone: | 105 to 150° C. (105 to 120° C.) |
| DL-lactide/TMC: | 110 to 150° C. (110 to 130° C.) |
| L-lactide/glycolide: | 105 to 150° C. (105 to 120° C.) |
| DL-lactide/glycolide | 110 to 150° C. (110 to 120° C.) |
| glycolide: | 130 to 190° C. (140 to 180° C.) |
| glycolide/TMC: | 110 to 190° C. (120 to 160° C.) |

The reactions are preferably carried out isothermically. In some cases, however, it is advantageous to start at lower temperatures in order to avoid strongly exothermic reactions, and to raise the temperature as the reaction proceeds in order to increase the speed of reaction of the monomers. This applies particularly to polymerisation involving monomers of comparatively low reactivity such as trimethylene carbonate or ε-caprolactone.

Preferred catalysts are tin or zinc compounds, while tin(II)halides such as tin(II)chloride and tin(II)alkoxides such as tin(II)octanoate or tin(II)ethylhexanoate are most particularly preferred. The additives used to regulate the chain length are compounds such as aliphatic alcohols, acids, hydroxycarboxylic acids and the esters thereof, water or oligomeric lactides. Water, lactic acid, oligomeric lactic acid, ethyl lactate or dodecanol are preferred.

In the process the catalysts are preferably used in low concentrations in order, on the one hand, to minimise the development of heat during the polymerisation by keeping the reaction speed low and, on the other hand, to prevent the reaction mass from polymerising to any appreciable extent while it is still in the melt reactor, which would make the transfer into the plastic containers more difficult because of the rise in viscosity. Moreover, the use of small amounts of catalyst is advantageous with respect to the use of the polyesters in the human body. In the case of tin compounds the preferred concentrations are 1 to 200 ppm, most preferably 5 to 100 ppm, particularly 10 to 50 ppm (calculated in each case as tin, based on the total reaction mass).

The preferred concentration of the chain length moderator depends on the structure of the moderator and the desired molecular weight of the polymer and is between 0 and 100,000 ppm, more preferably between 0 and 10,000 ppm, particularly 50 to 9,000 ppm, based on the total reaction mass.

The reaction times required depend on the reactivity of the monomer or monomers, the temperature selected and the concentration of catalyst and the required degree of conversion. Reaction times of between 0.5 and 25 days, more preferably between 1 and 10 days, particularly 2 to 9 days, are preferred.

As a rule the desired degree of polymerisation is reached when, of the monomers used, less than 10%, preferably 0 to 9%, most preferably 0.1 to 7%, particularly 0.2 to 5% are present in the polymer obtained by the process according to the invention.

The polyesters prepared by the process according to the invention generally have a mean inherent viscosity (Ubbelohde viscosimeter, chloroform, 0.1%, 25° C.) of between 0.2 and 12 dl/g, preferably between 0.5 and 10 dl/g, most preferably between 1.0 and 9.0 dl/g.

In a particularly preferred embodiment of the process according to the invention a double-walled reactor is filled with 10 to 100 kg of a cyclic monomer under a nitrogen gas atmosphere. The double wall is heated to an external temperature of 100 to 160° C. As soon as the monomer is totally melted, a chain length moderator, preferably an oligomeric lactic acid, a catalyst, preferably a solution of tin octanoate in toluene are added one after another. The quantity of catalyst is calculated so that the tin content based on the reaction mass as a whole is 5 to 100 ppm. The melt is homogenised for 5 to 60 minutes using a stirrer and then drained off through tubing, under a nitrogen gas atmosphere, into 8 to 90 plastic bottles made of polypropylene with a nominal capacity of 0.5 to 3 liters. The contents of the bottles are between 600 and 3500 g. The bottles are sealed and then placed in a warming cupboard preheated to 90 to 130° C. and left there for a period of 2 to 10 days. During this time the warming cupboard is made inert with a gently current of nitrogen. After being taken out of the warming cupboard the bottles are cooled to ambient temperature. Then the polymer blocks formed are removed from the bottles. Samples of material from the individual blocks were analysed by GC both for their inherent viscosity and for their residual content of monomer, as follows.

The following Examples serve to illustrate some processes carried out by way of example for preparing the reabsorbable polyesters. They are intended solely as possible methods described by way of example without limiting the invention to their contents.

EXAMPLE 1

A 20 liter double-walled glass reactor is filled with 20 kg of L-lactide under nitrogen gas. The double wall is heated to an external temperature of 125° C. As soon as the monomer is totally melted, 400 g of oligomeric L-lactic acid with a mean numerical molecular weight of 1800, 10 ml of a solution of tin octanoate in toluene are added one after another. The quantity of catalyst is calculated so that the tin content based on the reaction mass as a whole is 40 ppm. The melt is homogenised for 10 minutes using a mechanical stirrer and then drained off through tubing, under a nitrogen gas atmosphere, into 17 plastic bottles made of polypropylene with a nominal capacity of 1 liter. The contents of the bottles are between 1100 and 1200 g. The bottles are sealed and then placed in a warming cupboard preheated to 110° C. and left there for a period of 5 days. During this time the warming cupboard is made inert with a gentle current of nitrogen. After being taken out of the warming cupboard the bottles are cooled to ambient temperature. Then the bottle necks are cut off and the polymer blocks formed are removed from the bottles. Samples of material from the individual blocks were analysed by GC both for their inherent viscosity (Ubbelohde viscosimeter, chloroform, 0.1%, 25° C.) and for their residual content of L-lactide, as follows:

|  | inh. viscosity [dl/g] | residual lactide content [%] |
| --- | --- | --- |
| maximum | 6.1 | 6.4 |
| minimum | 5.8 | 4.0 |
| mean | 6.0 | 5.5 |
| standard deviation | 0.1 | 0.6 |

The polyesters of Examples 2 to 17 are prepared analogously:

| No. | monomer titration | batch [kg] | container | reaction temperature | reaction time | catalyst [ppm] | moderator [ppm] |
| --- | --- | --- | --- | --- | --- | --- | --- |
| 2 | L-lactide | 5 | polypropylene | 110° C. | 5 days | 50 | none |
| 3 | L-lactide | 20 | polypropylene 1 litre | 110° C. | 5 days | 40 | 7000 L * |
| 4 | L-lactide/ DL-lactide 72/28 mol % | 20 | polypropylene 1 litre | 110° C. | 5 days | 40 | 800 L * |
| 5 | L-lactide/ TMC 70/30 wt. % | 20 | polypropylene 1 litre | 110° C. | 9 days | 40 | 2000 L-ethyl lactate |
| 6 | L-lactide/ TMC | 5 | polypropylene 1 litre | 110° C. | 4 days | 40 | 5000 L-ethyl |

-continued

| No. | monomer titration | batch [kg] | container | reaction temperature | reaction time | catalyst [ppm] | moderator [ppm] |
|---|---|---|---|---|---|---|---|
| 7 | 70/30 wt. % DL-lactide | 2.5 | polypropylene 1 litre | 127° C. | 5 days | 20 | lactate 7000 DL-ethyl lactate |
| 8 | DL-lactide | 1.5 | Teflon 0.5 litre | 130° C. | 5 days | 40 | 6000 DL-ethyl lactate |
| 9 | DL-lactide/ glycolide 50/50 mol % | 2.5 | polypropylene 05 litre | 110° C. | 3 days | 40 | none |
| 10 | L-lactide | 5 | polypropylene 2 litre | 110° C. | 5 days | 40 | none |
| 11 | L-lactide | 5 | polypropylene 4 litre | 110° C. | 5 days | 40 | none |
| 12 | glycolide | 2 | Teflon 05 litre | 160° C. | 1 to 4 days | 10 | none |
| 13 | glycolide/ TMC 70/30 wt. % | 2 | Teflon 05 litre | 160° C. | 1 to 4 days | 10 | none |
| 14 | L-lactide/ glycolide 87/13 mol % | 7 | polypropylene 1 litre | 112° C. | 5 days | 40 | 80 dodecanol |
| 15 | L-lactide/ DL-lactide 83/17 mol % | 6 | polypropylene 1 litre | 110° C. | 8 days | 50 | 3000 L * |
| 16 | L-lactide/ DL-lactide 72/28 mol % | 4 | polypropylene 1 litre | 115° C. | 3 days | 40 | 600 dodecanol |
| 17 | L-lactide | 51 kg | polypropylene 1 litre | 112° C. | 3 days | 40 | 800 dodecanol |

Catalyst in each case: tin(II)ethylhexanoate, given in ppm of tin based on the reaction mass
*L = oligomeric L-lactic acid with a number average molecular weight of 1800

| No. | inh. viscosity [dl/g] | residual content of monomer [%] |
|---|---|---|
| 2 | 8.4 | 1.5 |
| 3 | 3.3 | 5.0 |
| 4 | 7.5 | 4.5 |
| 5 | 1.3 | 0.3 lactide. 0.2 TMC |
| 6 | 0.7 | 0.3 lactide. 0.3 TMC |
| 7 | 0.5 | 1.8 |
| 8 | 0.5 | 1.9 |
| 9 | 3.4 ** | 7.6 DL-lactide glycolide not detectable |
| 10 | 7.8 | 2.0 |
| 11 | 8.3 | 1.9 |
| 12 | 1.5 to 2.1 ** | 0.5 to 2.6 |
| 13 | 2.1 to 2.3 ** | <0.4 glycolide 0.4 to 2.6 TMC |
| 14 | 6.3 | 9 |
| 15 | 4.2 | 7 |
| 16 | 3.8 | 2 |
| 17 | 3.8 | 0.50 |

The inherent viscosity was measured in chloroform at 25° C. in 0.1% solution, exceptions are indicated by **.
In these cases it was determined in hexafluoroisopropanol at 30° C. in 0.1% solution.

What is claimed is:

1. A process for preparing reabsorbable polyesters by bulk polymerisation, wherein the reaction components are melted and homogenised in a stirred reactor, the reaction mixture is then transferred into a number of smaller-volume containers, the reaction mixture is polymerised in these containers and the polyester obtained is isolated by removing it from the containers.

2. The process according to claim 1, wherein the polymer has an inherent viscosity of between 0.2 and 12.

3. The process according to claim 1, wherein the reabsorbable polyester is a polylactide or polyglycolide.

4. The process according to claim 3, wherein the reabsorbable polyester is poly(L-lactide).

5. The process according to claim 3, wherein the reabsorbable polyester is a copolymer of various stereoisomeric lactides.

6. The process according to claim 5, wherein the reabsorbable polyester is a copolymer of L-lactide and DL-lactide.

7. The process according to claim 3, wherein the reabsorbable polyester is poly(DL-lactide).

8. The process according to claim 1, wherein the reabsorbable polyester is a copolymer of glycolide and trimethylene carbonate.

9. The process according to claim 1, wherein the reabsorbable polyester is a copolymer of lactide and glycolide.

10. The process according to claim 9, wherein the reabsorbable polyester is a copolymer of DL-lactide or L-lactide and glycolide.

11. The process according claim 1, wherein the reabsorbable polyester is a copolymer of lactide and trimethylene carbonate.

12. The process according to claim 1, wherein the reabsorbable polyester is a copolymer of lactide and ε-caprolactone.

13. The process according to claim 1, wherein the reabsorbable polyester is a terpolymer.

14. The process according to claim 1, wherein the smaller-volume containers consist of a plastic.

15. The process according to claim 14, wherein the smaller-volume containers consist essentially of a polyolefin.

16. The process according to claim 15, wherein the plastic container consists of polypropylene.

17. The process according to claim 1, wherein the plastic containers consist of a fluorinated or partially fluorinated polymers.

18. The process according to claim 17, wherein the plastic containers consist of polytetrafluoroethane.

19. The process according to claim 1, wherein the ratio of the internal volume of the stirred reactor to that of the internal volume of one of the smaller containers is between 1000:1 and 2:1.

20. The process according to claim 1, wherein the internal volume of the smaller container is between 50 ml and 10 liters.

21. The process according to claim 20, wherein the internal volume is between 100 ml and 5 liters.

* * * * *